(12) United States Patent
Hsu et al.

(10) Patent No.: US 7,888,946 B2
(45) Date of Patent: Feb. 15, 2011

(54) PORTABLE ELECTRONIC DEVICE WITH PROJECTION FUNCTION

(75) Inventors: Kuo-Kuei Hsu, Taipei (TW); Ching-Fu Yang, Taipei (TW); Yan-Shan Wang, Taipei (TW)

(73) Assignee: Compal Electronics, Inc., Taipei (TW)

( * ) Notice: Subject to any disclaimer, the term of this patent is extended or adjusted under 35 U.S.C. 154(b) by 100 days.

(21) Appl. No.: 12/267,620

(22) Filed: Nov. 10, 2008

(65) Prior Publication Data

US 2009/0256052 A1 Oct. 15, 2009

(30) Foreign Application Priority Data

Apr. 9, 2008 (TW) .............................. 97112834 A

(51) Int. Cl.
*G01V 3/18* (2006.01)
*F16M 11/38* (2006.01)

(52) U.S. Cl. ...................................... 324/539; 248/170

(58) Field of Classification Search ................. 248/649, 248/351; 353/119; 324/539
See application file for complete search history.

(56) References Cited

U.S. PATENT DOCUMENTS

2007/0177115 A1 * 8/2007 Yin et al. ..................... 353/122

* cited by examiner

*Primary Examiner*—Terrell Mckinnon
*Assistant Examiner*—Erin Smith
(74) *Attorney, Agent, or Firm*—Jianq Chyun IP Office

(57) ABSTRACT

A portable electronic device with projection function including a host, a projection module, a signal line, a first adjusting leg and a second adjusting leg is provided. The host has a chamber at its side. The projection module is for outputting an image light beam. The projection module is connected to the host through the signal line. The first adjusting leg is pivoted to the projection module. The second adjusting leg is pivoted to the projection module, wherein the first adjusting leg and the second adjusting leg can be stored into the chamber with the projection module after pivoting.

11 Claims, 13 Drawing Sheets

PORTABLE ELECTRONIC DEVICE WITH PROJECTION FUNCTION

CROSS-REFERENCE TO RELATED APPLICATION

This application claims the priority benefit of Taiwan application serial no. 97112834, filed on Apr. 9, 2008. The entirety of the above-mentioned patent application is hereby incorporated by reference herein and made a part of this specification.

BACKGROUND OF THE INVENTION

1. Field of the Invention

The present invention relates to an electronic device and more particularly, to a portable electronic device with a projection function.

2. Description of Related Art

With advancement in projection display technology, there have been rapid development and significant breakthroughs in projection systems and equipment in recent years. Currently, there are three major types of projectors including cathode ray tubes (CRT), high temperature polysilicon transmissive liquid crystal display panel (commonly referred to as liquid crystal projectors), and digital light source processors, wherein the liquid crystal projectors characterized by portability and easy adjustability are more commonly used by the public.

An operating principle of a projector is the same as that of a transparency or that of a slide, which uses a high-luminance lamp as a light source and projects content onto a white screen or wall. All images of the projector are projected from a single lens in no need of adjusting the focus of the images. At present, the projector is often used to project and magnify an image on a transparency onto a white screen or a wall for purposes of propaganda, lecture, presentation, and so on. In addition, a projector can be further connected to a computer directly and project images on the computer onto a white screen or a wall, which saves the trouble of making transparencies and further promotes the practice of a paperless office.

However, in the current workplace, the projector is still often used in together with a notebook computer in order to display an image on a computer screen onto a large screen or a wall for use in a conference or a demonstration. Consequently, transportation and storage of relevant projection equipment and the notebook computer as well as installation of connection between the projection equipment and the notebook computer result in problems including inconvenient usage as well as difficult and time-consuming installation.

SUMMARY OF THE INVENTION

The present invention provides a portable electronic device, wherein a user may easily and conveniently retrieve and use the projection module.

The present invention provides a portable electronic device including a host, a projection module, a signal line, a first adjusting leg and a second adjusting leg. The host has a chamber at one side. The projection module is for outputting an image light beam. The projection module is connected to the host through the signal line. The first adjusting leg is pivoted to the projection module. The second adjusting leg is pivoted to the projection module, wherein the first adjusting leg and the second adjusting leg, after pivoting, can be stored into the chamber with the projection module.

In one embodiment of the present invention, the above-mentioned first adjusting leg has a first limiting portion and the second adjusting leg has a second limiting portion. The second limiting portion in association with the first limiting portion restricts a pivoting range of the first adjusting leg relative to the second adjusting leg. The second adjusting leg has a third limiting portion and the projection module has a fourth limiting portion. The third limiting portion in association with the fourth limiting portion restricts a pivoting range of the second adjusting leg relative to the projection module.

In one embodiment of the present invention, the above mentioned projection module has a first annular wave-shaped surface and the second adjusting leg has a second annular wave-shaped surface corresponding to the first annular wave-shaped surface to pivot stepwise the projection module relative to the second adjusting leg.

In one embodiment of the present invention, the above-mentioned portable electronic device further includes a first component and a second component. The first component is disposed in the projection module. The second component is disposed in the second adjusting leg, wherein the first component and the second component have a magnetic attraction force therebetween to force the first annular wave-shaped surface to contact the second annular wave-shaped surface.

In one embodiment of the present invention, at least one of the abovementioned first component and second component is a permanent magnet.

In one embodiment of the present invention, at least one of the abovementioned first component and second component is a magnetically sensitive component.

In one embodiment of the present invention, the above-mentioned portable electronic device further includes at least a curved electrode and at least an elastic terminal. The curved electrode is disposed in the projection module and coupled to the signal line. The elastic terminal is disposed in the second adjusting leg, wherein when the second adjusting leg pivots relatively to the projection module, the elastic terminal still contacts the curved electrode.

In one embodiment of the present invention, the above-mentioned curved electrode is formed on a flexible circuit board. The curved electrode is coupled to the signal line.

In one embodiment of the present invention, one section of the abovementioned signal line passes through the pivot connection between the projection module and the second adjusting leg, while another section of the signal line is hidden in the second adjusting leg.

In one embodiment of the present invention, the above-mentioned projection module receives image signals from the host through wireless transmission.

In one embodiment of the present invention, the above-mentioned host has an operation surface, a keyboard, and a touch panel, wherein the keyboard and the touch panel are disposed on the operation surface.

In one embodiment of the present invention, the above-mentioned portable electronic device further includes a display unit. The display unit is pivoted to the host.

When a user needs to use the projection module, the user may take out the projection module from the chamber of the host and set up the projection module with the first and second adjusting legs. When the user no longer needs the projection module, he may store the projection module with the first and second adjusting legs after pivoting in the chamber. Therefore, the user may more conveniently utilize the projection module to present images on the display unit with reduced costs and space.

In order to make the above and other objects, features and advantages of the present invention more comprehensible, embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1A:
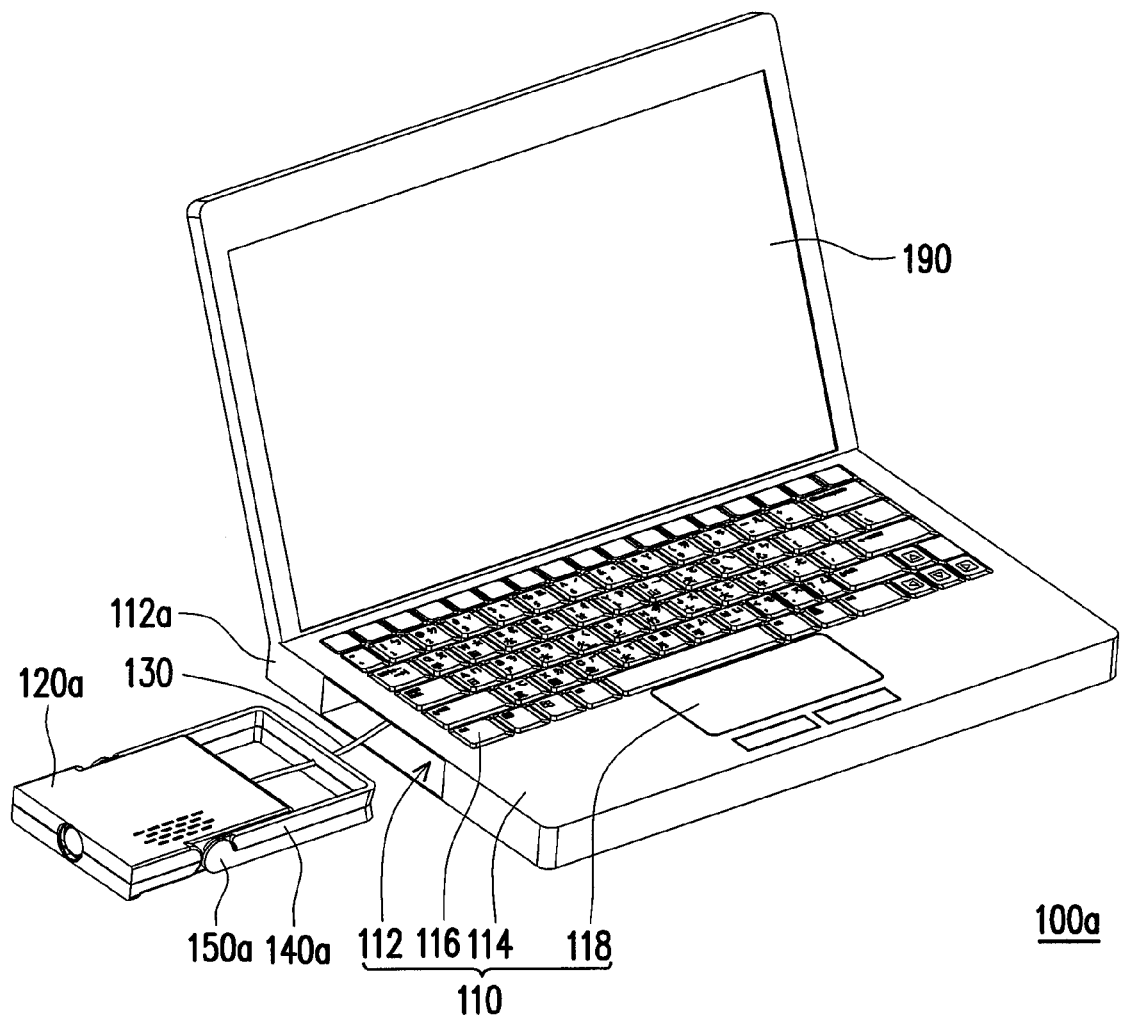
FIG. 1A is a schematic view of a portable electronic device with projection function of one embodiment of the present invention.
Figure 1B:
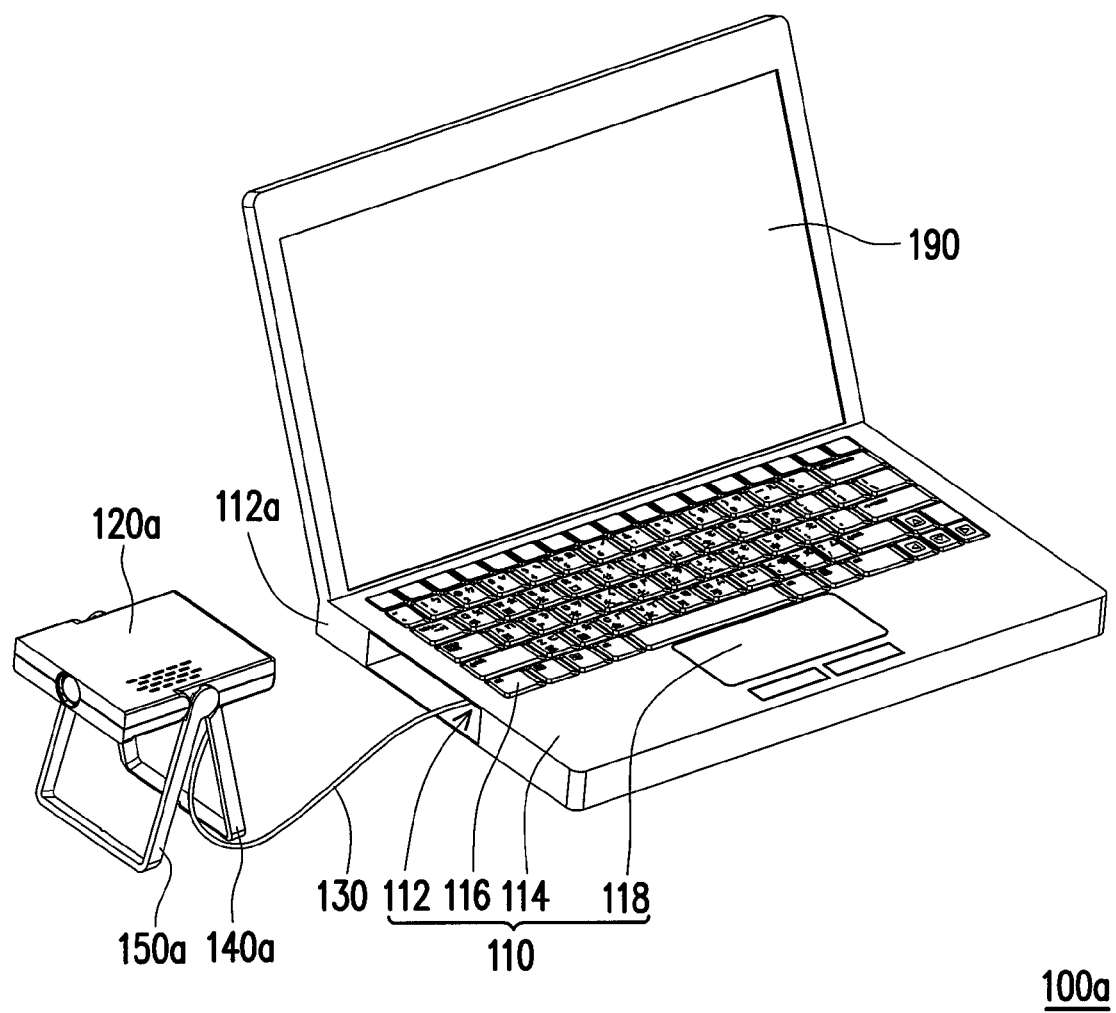
FIG. 1B is a schematic view illustrating the projection module set up with the first adjusting leg and the& second adjusting leg of FIG. 1A.

FIG. 1A is a schematic view of a portable electronic device with projection function of one embodiment of the present invention. FIG. 1B is a schematic view illustrating the projection module set up with the first adjusting leg and the second adjusting leg of FIG. 1A. Referring to both FIG. 1A and FIG. 1B, a portable electronic device 100a includes a host 110, a projection module 120a, a signal line 130, a first adjusting leg 140a, and a second adjusting leg 150a, wherein the portable electronic device 100a is a notebook computer, for example.

Specifically, the host 110 has a chamber 112, an operation surface 114, a keyboard 116, and a touch panel 118. The chamber 112 is disposed on a side 112a of the host 110. The keyboard 116 and the touch panel 118 are disposed on the operation surface 114. In addition, the projection module 120a is connected to the host 110 through the signal line 130 and is for outputting an image light beam. The first adjusting leg 140a is pivoted to the projection module 120a. The second adjusting leg 150a is pivoted to the projection module 120a, wherein the first adjusting leg 140a and the second adjusting leg 150a, after pivoting, can be stored into the chamber 112 with the projection module 120a.

Furthermore, in the present embodiment, the portable electronic device 100a further includes a display unit 190. The display unit 190 is pivoted to the host 110. The projection module 120a may receive image signals from the host 110 through the signal line 130 and project images from the display unit 190. In addition, the projection module 120a may also receive power supplied from the host 110 through the signal line 130.

In brief, when a user needs to use the projection module 120a, the user may take out the projection module 120a from the chamber 112 of the host 110 and connect the projection module 120a to the host 110 through the signal line 130, wherein the projection module 120a is set up with the first adjusting leg 140a and the second adjusting leg 150a, receives image signals from the host 110 of the portable electronic device 100a through the signal line 130, and projects images from the display unit 190.

When the user no longer needs the projection module 120a, the first adjusting leg 140a and the second adjusting leg 150a, after pivoting, may be stored with the projection module 120a in the chamber 112. Thereby, a user may more easily and conveniently make use of the projection module 120a without; needing to additionally purchase a conventional projector, such that troublesome installation of circuits connected between the conventional projector and the electronic device can be prevented. At the same time, an application range of the portable electronic device 100a can be expanded.

Figure 2A:
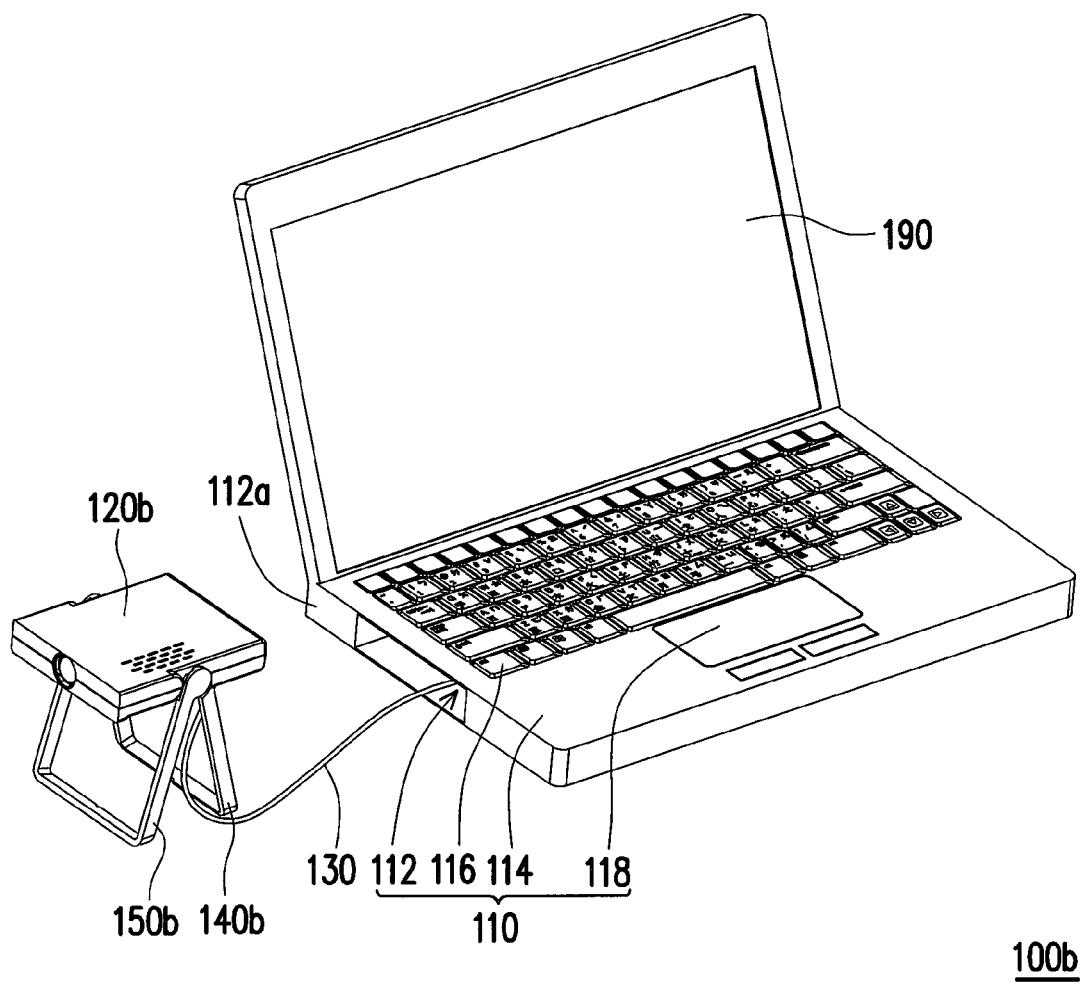
FIG. 2A is a schematic view of a portable electronic device with projection function of another embodiment of the present invention.
Figure 2B:
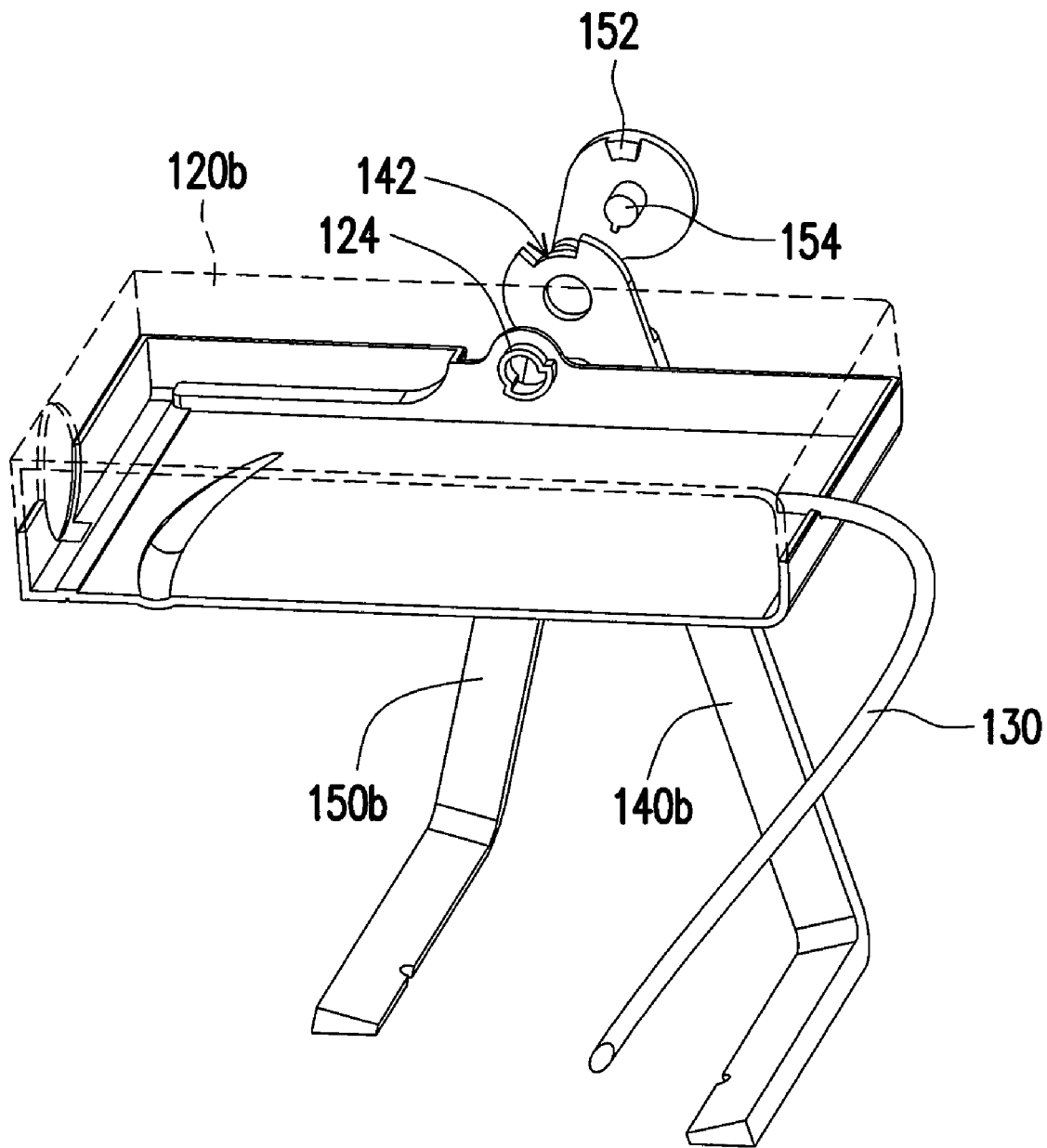
FIG. 2B is a partially exploded schematic view of the projection module, the first adjusting leg, and the second adjusting leg of FIG. 2A.

FIG. 2A is a schematic view of a portable electronic device with projection function of another embodiment of the present invention. FIG. 2B is a partially exploded schematic view of the projection module, the first adjusting leg, and second adjusting leg of FIG. 2A. Referring to both FIG. 2A and FIG. 2B, in the present embodiment, a portable electronic device 100b of FIG. 2A is similar to the portable electronic device 100a of FIG. 1A with differences in a projection module 120b, a first adjusting leg 140b, and a second adjusting leg 150b of FIG. 2A.

Specifically, in the present embodiment, the first adjusting leg 140b and the second adjusting leg 150b are respectively pivoted to the projection module 120b, wherein the adjusting leg 140b has a first limiting portion 142, the second adjusting leg 150b has a second limiting portion 152, and the second limiting portion 152 in association with the first limiting portion 142 restricts a pivoting range of the first adjusting leg 140b relative to the second adjusting leg 150b.

The second adjusting leg 150b has a third limiting portion 154 and the projection module 120b has a fourth limiting portion 124. The third limiting portion 154 in association with the fourth limiting portion 124 restricts a pivoting range of the second adjusting leg 150b relative to the projection module 120b. In the present embodiment, the first adjusting leg 140b and the second adjusting leg 150b, after pivoting, can be stored into a chamber 112 of a host 110 with the projection module 120b.

Figure 2C:
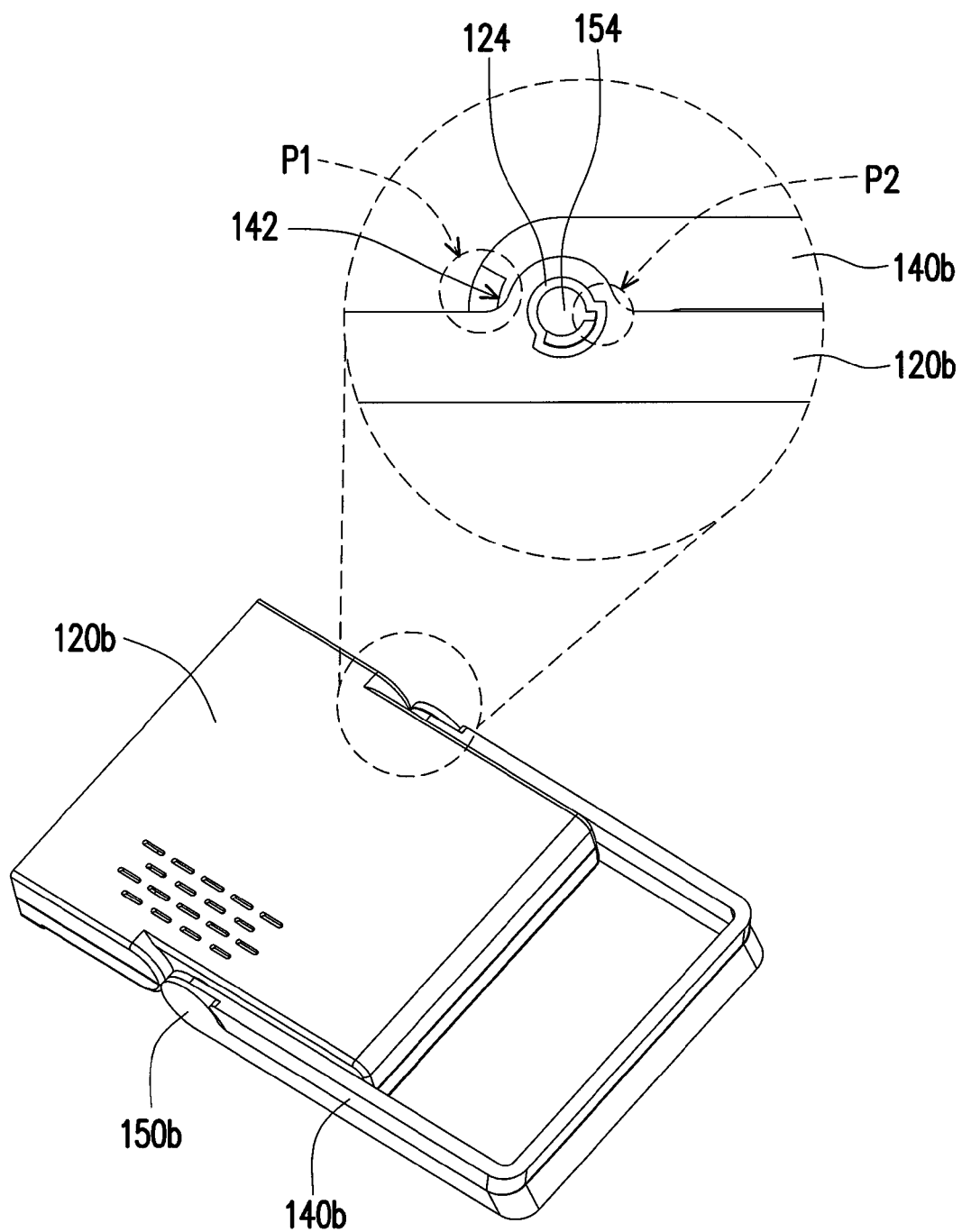
FIG. 2C is a schematic view illustrating the first adjusting leg and the second adjusting leg not setting up the projection module of FIG. 2A.
Figure 2D:
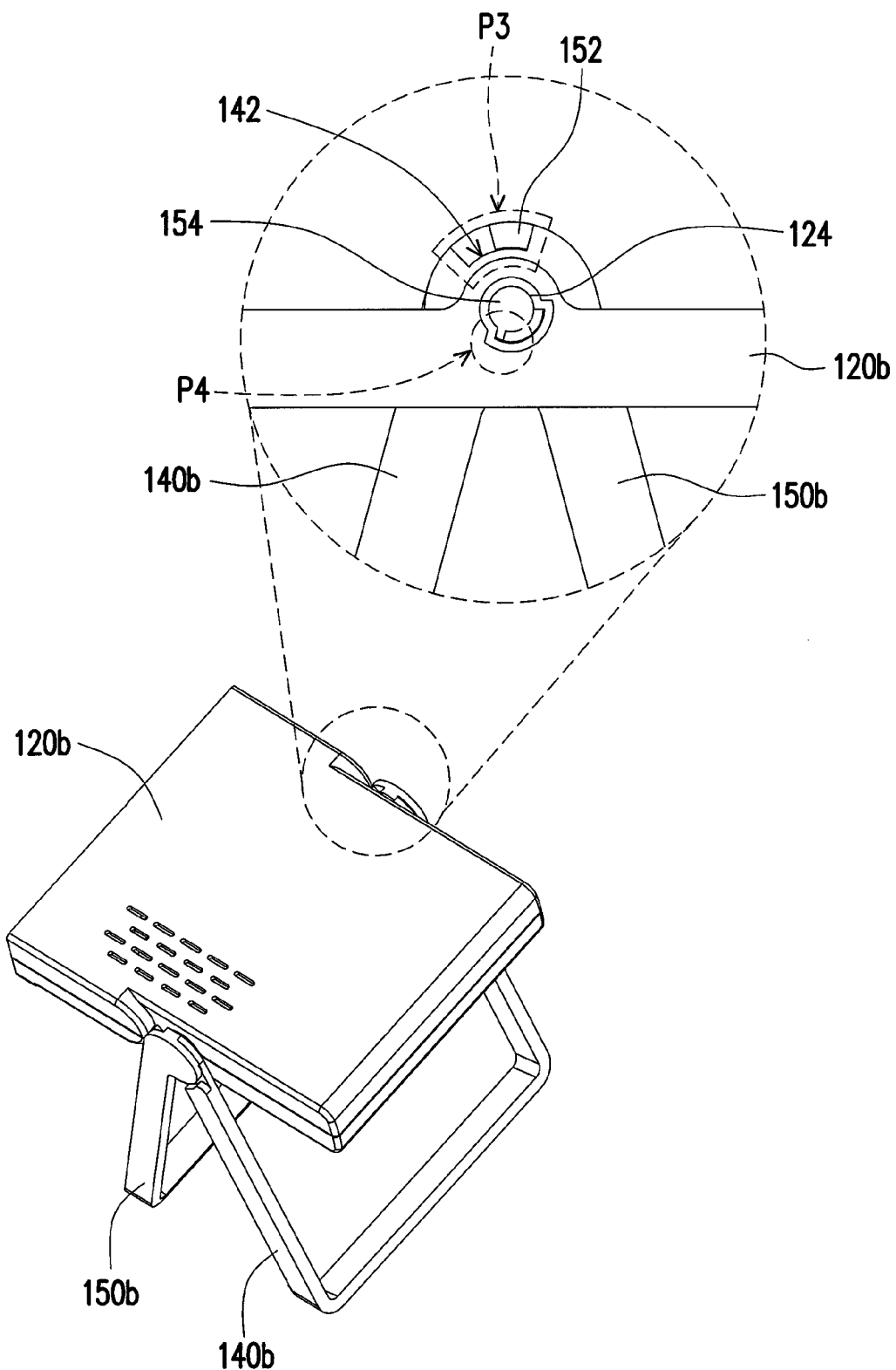
FIG. 2D is a schematic view illustrating the projection module set up with the first adjusting leg and the second adjusting leg of FIG. 2B.

Furthermore, FIG. 2C is a schematic view illustrating the first adjusting leg and the second adjusting leg not setting up the projection module of FIG. 2A. FIG. 2D is a schematic view illustrating the projection module set up with the first adjusting leg and the second adjusting leg of FIG. 2B. Referring to both FIG. 2C and FIG. 2D, in the present embodiment, when the second limiting portion 152 is at a first position P1 relative to the first limiting portion 142 and the third limiting portion 154 is at a second position P2 relative to the fourth limiting portion 124, the first adjusting leg 140b and the second adjusting leg 150b are closed together.

When the first limiting portion 142 pivots to a third position P3 relative to the second limiting portion 152 and the third limiting portion 154 pivots to a fourth position P4 relative to the fourth limiting portion 124, the first adjusting leg 140b and the second adjusting leg 150b are open and set up the projection module 120b.

In brief, the first limiting portions 142 and the second limiting portions 152 are used in association to limit the pivoting range of the first adjusting leg 140b relative to the second adjusting leg 150b so that the first adjusting leg 140b and the second adjusting leg 150b may be opened to set up the projection module 120b or closed to be stored in the chamber 112 with the projection module 120b. Additionally, the third limiting portions 154 and the fourth limiting portions 124 are used in association to restrict the pivoting range of the second adjusting leg 150b relative to the projection module 120b to adjust a pivoting angle of the projection module 120b relative to the second adjusting leg 150b.

In other words, a user may use the pivoting angle of the projection module 120b relative to the second adjusting leg 150b to control height of a projected image, providing easy and convenient operation of the projection module 120b.

Figure 3A:
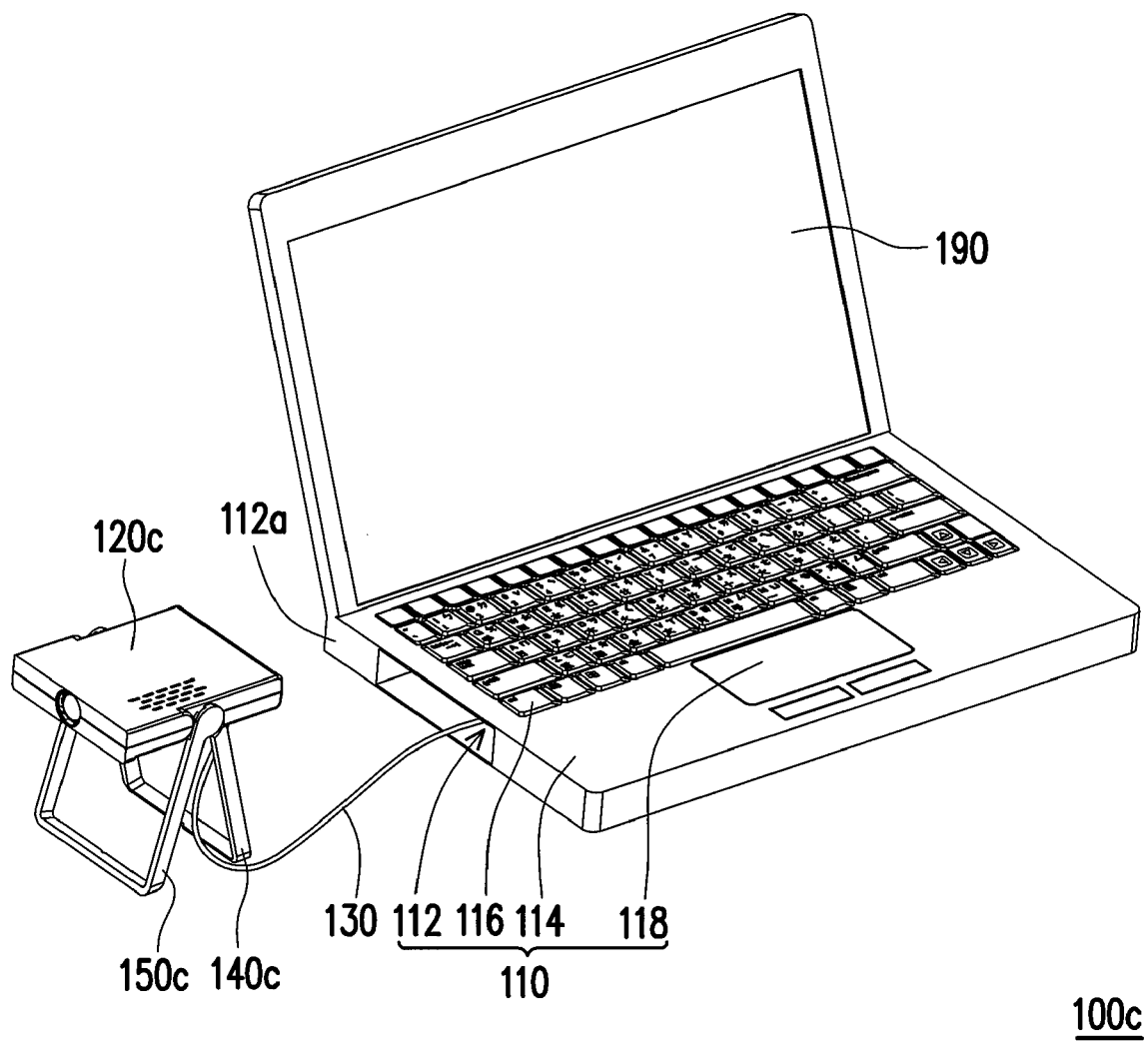
FIG. 3A is a schematic view of a portable electronic device with projection function of another embodiment of the present invention.
Figure 3B:
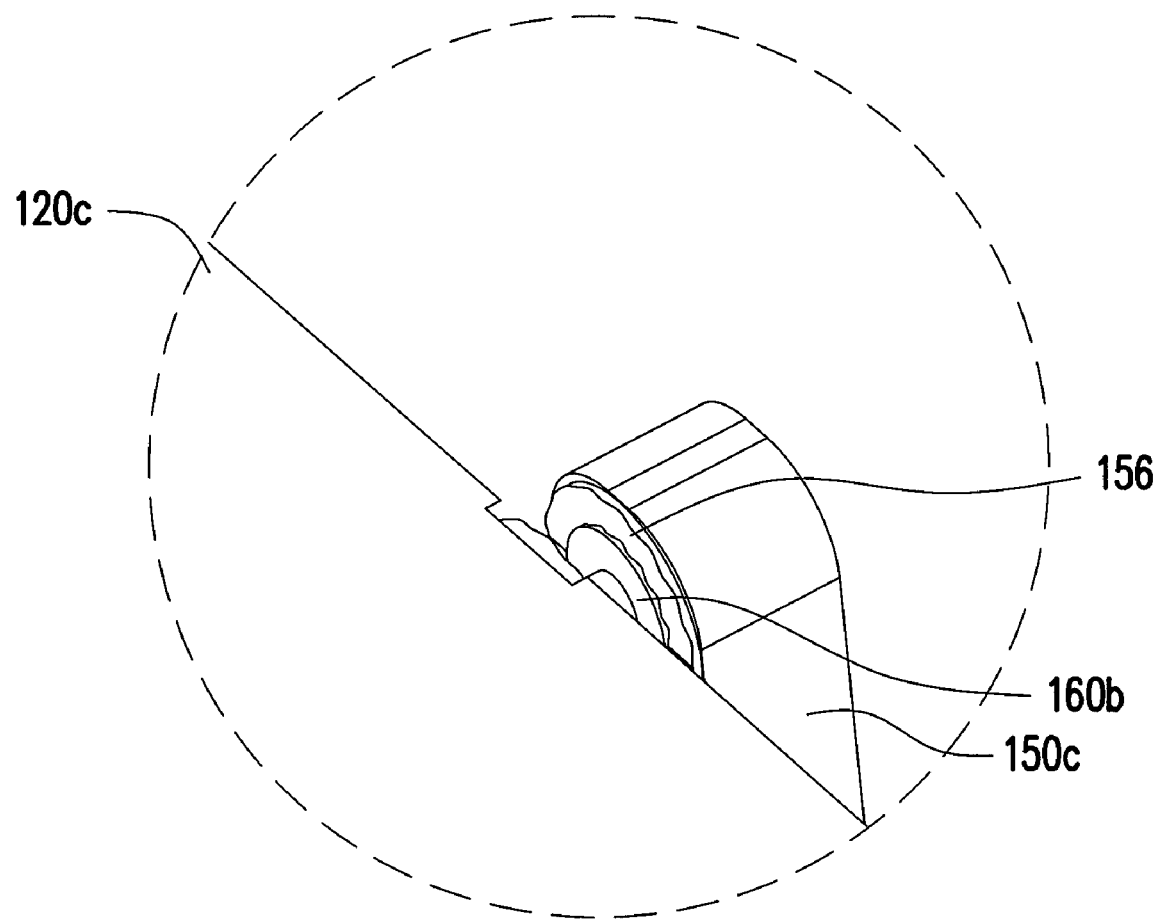
FIG. 3B is a partially enlarged schematic view of a projection module and a second adjusting leg.
Figure 3C:
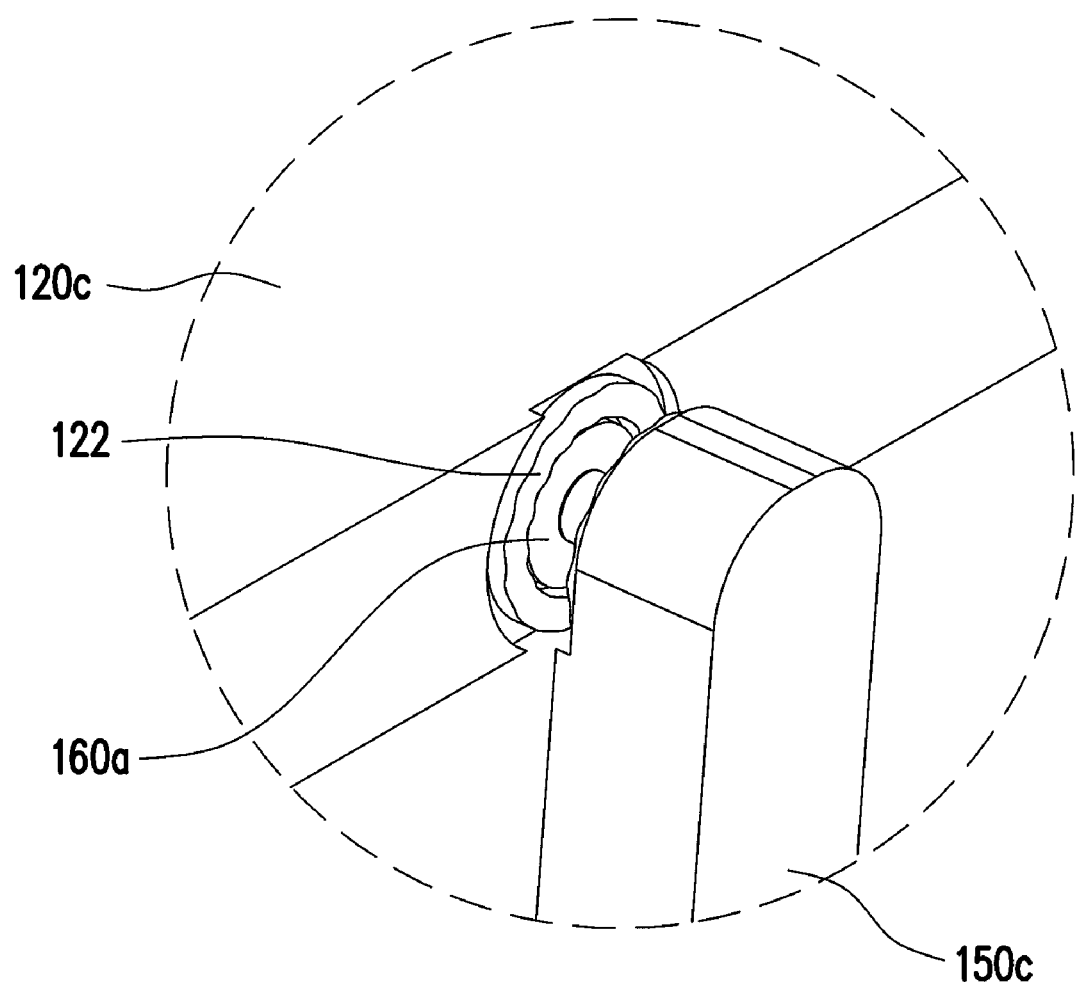
FIG. 3C is a schematic view of the projection module and the second adjusting leg of FIG. 3B from another view angle.

FIG. 3A is a schematic view of a portable electronic device with projection function of another embodiment of the present invention. FIG. 3B is a partially enlarged schematic view of a projection module and a second adjusting leg. FIG. 3C is a schematic view of the projection module and the second adjusting leg of FIG. 3B from another view angle. Referring to all FIG. 3A, FIG. 3B, and FIG. 3C, in the present embodiment, a portable electronic device 100c of FIG. 3A is similar to the portable electronic device 100a of FIG. 1A with differences in a projection module 120c and a second adjusting leg 150c of FIG. 3A.

Specifically, in the present embodiment, the projection module 120c has a first annular wave-shaped surface 122 and the second adjusting leg 150c has a second annular wave-shaped surface 156 corresponding to the first annular wave-shaped surface 122 to pivot stepwise the projection module 120c relative to the second adjusting leg 150c.

In addition, in the present embodiment, the portable electronic device 100c further includes a first component 160a and a second component 160b. The first component 160a is disposed in the projection module 120c. The second component 160b is disposed in the second adjusting leg 150c, wherein the first component 160a and the second component 160b have a magnetic attraction force therebetween to force the first annular wave-shaped surface 122 to contact the second annular wave-shaped surface 156.

It should be noted that in the present embodiment, the first component 160a is a permanent magnet and the second component 160b is a magnetically sensitive component. However, the present invention does not limit the types of the first component 160a and the second component 160b. In other embodiments, the second component 160b may be a permanent magnet and the first component 160a may be a magnetically sensitive component, which still belongs to a technical means adoptable in the present invention and falls within the protection scope of the present invention.

In brief, a magnetic attraction force between the first component 160a and the second component 160b forces the first annular wave-shaped surface 122 to contact the second annular wave-shaped surface 156. The pivoting angle of the projection module 120c relative to the second adjusting leg 150c. is adjusted by pivoting the first annular wave-shaped surface 122 relative to the second annular wave-shaped surface 156.

In other words, the pivoting angle of the projection module 120c relative to the second adjusting leg 150c may be adjusted with the above mentioned stepwise method. The user may use the pivoting angle of the projection module 120c relative to the second adjusting leg 150c to control height of a projected image, providing easy and convenient operation of the projection module 120c.

Figure 4A:
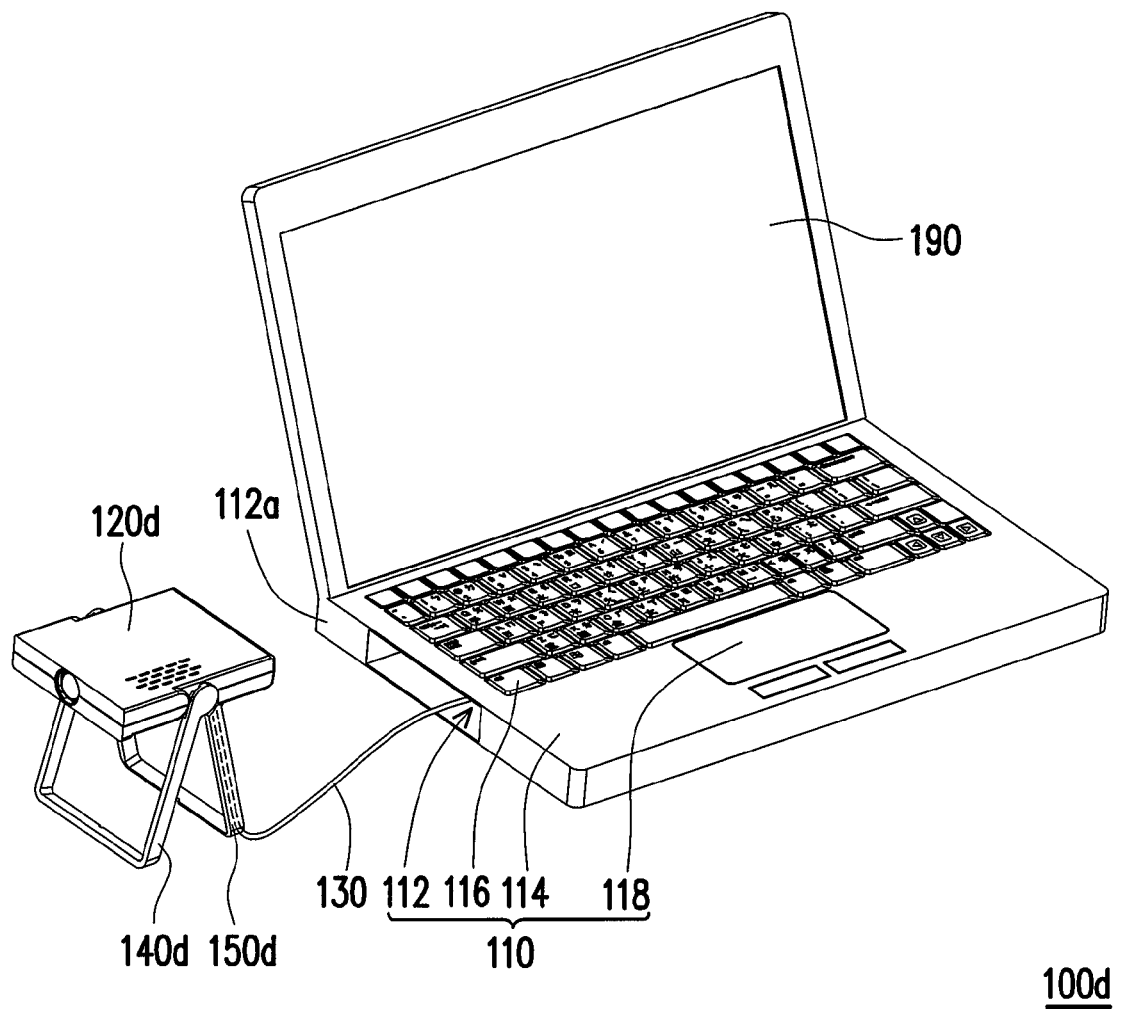
FIG. 4A is a schematic view of a portable electronic device with projection function of another embodiment of the present invention.
Figure 4B:
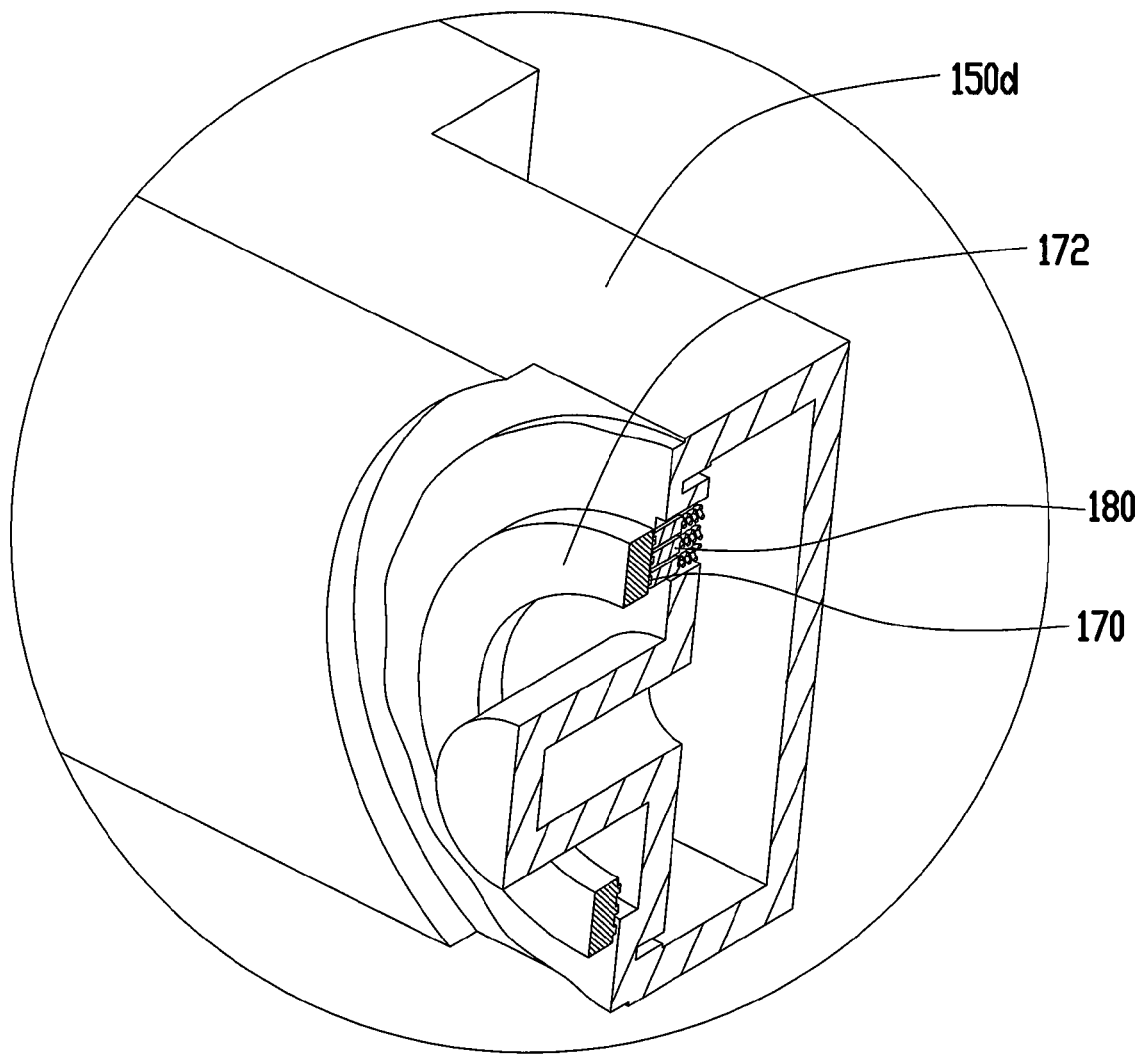
FIG. 4B is a partially enlarged cross-sectional view of the second adjusting leg of FIG. 4A.
Figure 4C:
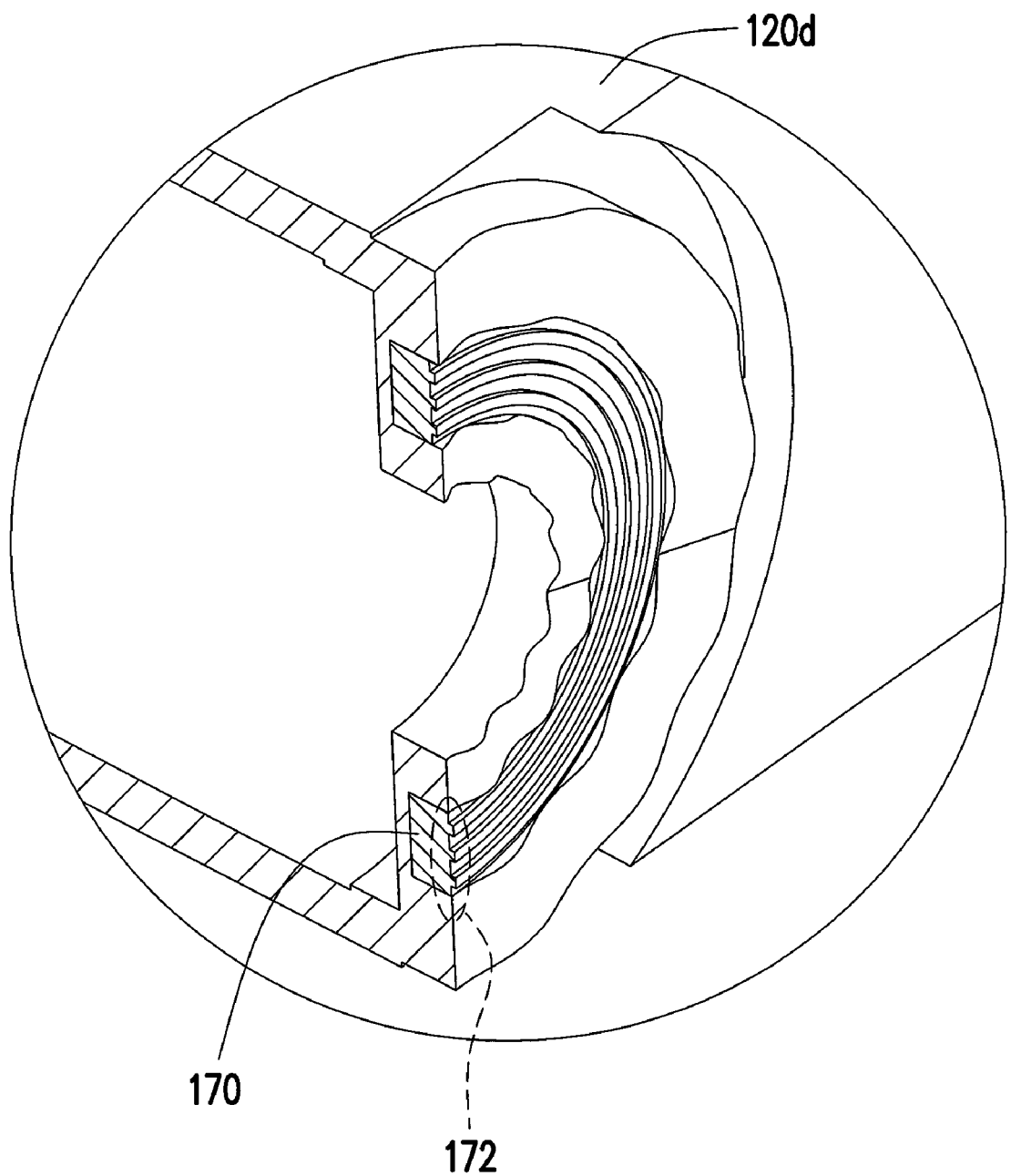
FIG. 4C is a partially enlarged cross-sectional view of the projection module of FIG. 4A.

FIG. 4A is a schematic view of a portable electronic device with projection function of another embodiment of the present invention. FIG. 4B is a partially enlarged cross-sectional view of the second adjusting leg of FIG. 4A. FIG. 4C is a partially enlarged cross-sectional view of the projection module of FIG. 4A. Referring to all FIG. 4A, FIG. 4B, and FIG. 4C, in the present embodiment, a portable electronic device 100d of FIG. 4A is similar to the portable electronic device 100a with a difference that the portable electronic device 100d of FIG. 4A further includes at least a curved electrode 170 and at least an elastic terminal 180.

Specifically, the curved electrode 170 is formed on a flexible circuit board 172, disposed in a projection module 120d, and coupled to a signal line 130, wherein a section of the signal line 130 passes through pivot connection between the projection module 120d and a second adjusting leg 150d and another section of the signal line 130 is hidden in the second adjusting leg 150d. The elastic terminal 180 is disposed in the second adjusting leg 150d. In the present embodiment, the projection module 120d may receive image signals from the host 110 through the signal line 130 and project an image from a display unit 190.

Figure 4D:
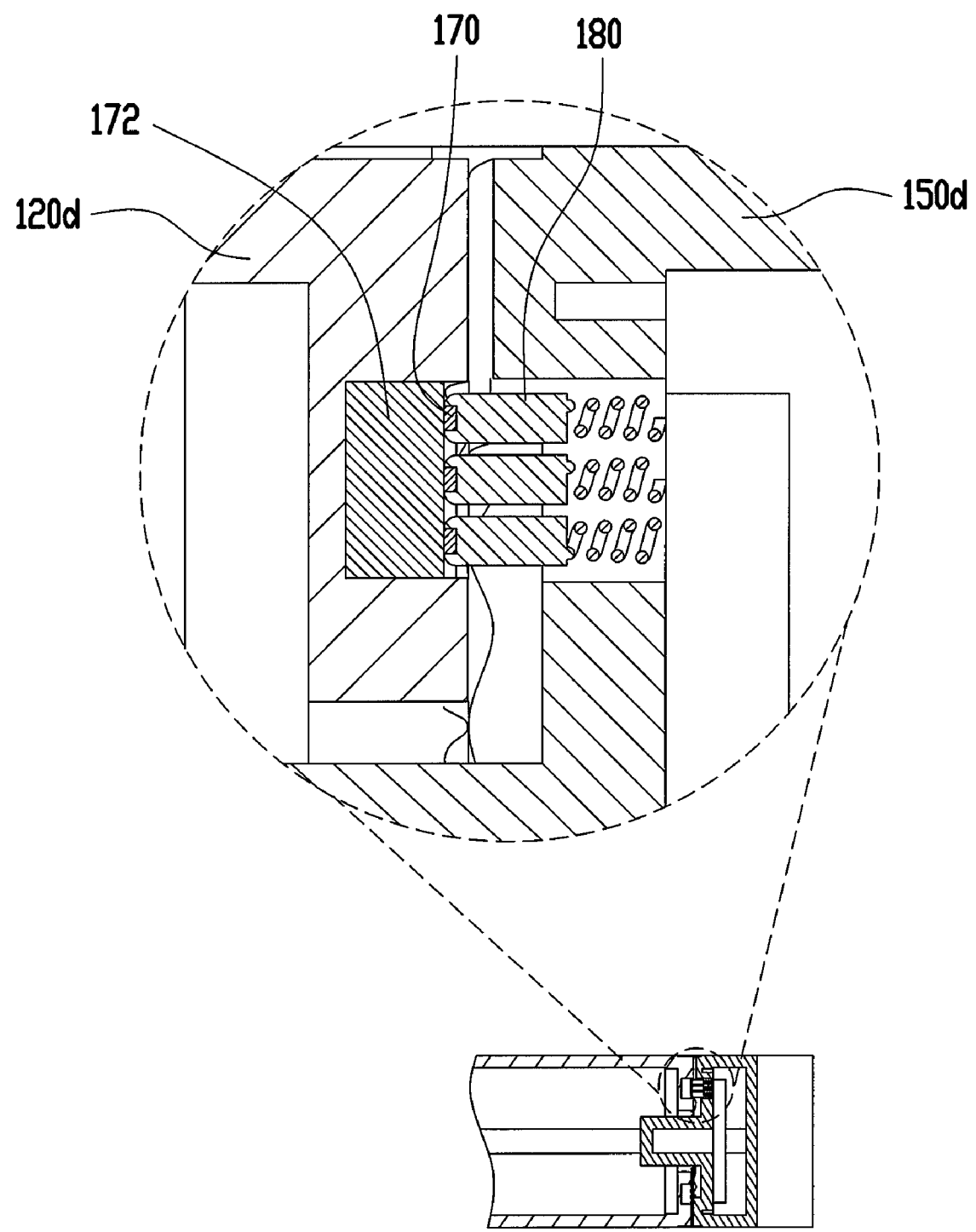
FIG. 4D illustrates the elastic terminal contacting the curved electrode of FIG. 4A.

Referring to FIG. 4D, when the second adjusting leg 150d and the projection module 120d are placed horizontally, the elastic terminal 180 contacts the curved electrode 170 and the projection module 120d receives image signals from the host 110 through the signal line 130. In addition, when the second adjusting leg 150d pivots relatively to the projection module 120d, the elastic terminal 180 still contacts the curved electrode 170.

It should be mentioned that the present invention does not limit the types of connection between the projection module 120d and the portable electronic device 100d. Although the projection module 120d described herein uses the signal line 130 to receive and transmit signals from the host 110 of the portable electronic device 100d, in other embodiments, the projection module 120d may also use wireless transmission to receive signals from the host 110 of the portable electronic device 100d, which still belongs to a technical means adoptable in the present invention and falls within the protection scope of the present invention.

In brief, the projection module 120d may receive image signals from the host 110 through the elastic terminal 180 contacting the curved electrode 170 and project an image from the display unit 190. In addition, the portable electronic device 100d has a promoted visual appeal because part of the signal line 130 is hidden in the second adjusting leg 150d.

It should be mentioned that the present invention does not limit the types of the projection module 120d, the first adjusting leg 140d, and the second adjusting leg 150d, and the types may also be a combination of the projection modules 120a~120d, the first adjusting legs 140a~140d, and the second adjusting legs 150a~150d of FIGS. 1A, 2A, 3A, and 4A, which still belongs to a technical means adoptable in the present invention and falls within the protection scope of the present invention.

In summary, when a user needs to use the projection module, the user may take out the projection module from the chamber of the host and fix and set up the projection module with the first and second adjusting legs. When the user no longer needs the projection module, he may store the projection module with the first and second adjusting legs after pivoting in the chamber. Therefore, the user may more conveniently utilize the projection module.

Moreover, the present invention not only expands the application range of the portable electronic device but also provides a more convenient tool for use during conferences or demonstration. It is neither necessary to additionally purchase a conventional projector nor required to install the circuits connecting the conventional projector to an electronic device, thus giving rise to reduced costs and efficient space utilization.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A portable electronic device with projection function, comprising:
    a host, having a chamber at one side;
    a projection module, for outputting an image light beam;
    a signal line, wherein the projection module connects to the host through the signal line;
    a first adjusting leg, pivoted to the projection module; and
    a second adjusting leg, pivoted to the projection module,
    wherein a section of the signal line passes through pivot connection between the projection module and the second adjusting leg, another section of the signal line is hidden in the second adjusting leg, and the first adjusting leg and the second adjusting leg, after pivoting, are stored in the chamber with the projection module.

2. The portable electronic device with projection function according to claim 1, wherein the first adjusting leg has a first limiting portion, the second adjusting leg has a second limiting portion, the second limiting portion in association with the first limiting portion restricts a pivoting range of the first adjusting leg relative to the second adjusting leg, the second adjusting leg has a third limiting portion, the projection module has a fourth limiting portion, and the third limiting portion in association with the fourth limiting portion restricts a pivoting range of the second adjusting leg relative to the projection module.

3. The portable electronic device with projection function according to claim 1, wherein the projection module has a first annular wave-shaped surface and the second adjusting leg has a second annular wave-shaped surface corresponding to the first annular wave-shaped surface to pivot stepwise the projection module relative to the second adjusting leg.

4. The portable electronic device with projection function according to claim 3, further comprising:
    a first component, disposed in the projection module; and
    a second component, disposed in the second adjusting leg,
    wherein the first component and the second component have a magnetic attraction force therebetween to force the first annular wave-shaped surface to contact the second annular wave-shaped surface.

5. The portable electronic device with projection function according to claim 4, wherein at least one of the first component and the second component is a permanent magnet.

6. The portable electronic device with projection function according to claim 5, wherein at least one of the first component and the second component is a magnetically sensitive component.

7. The portable electronic device with projection function according to claim 1, further comprising:
    at least a curved electrode, disposed in the projection module and coupled to the signal line; and
    at least an elastic terminal, disposed in the second adjusting leg, wherein when the second adjusting leg pivots relatively to the projection module, the elastic terminal still contacts the curved electrode.

8. The portable electronic device with projection function according to claim 7, wherein the curved electrode is formed on a flexible circuit board and coupled to the signal line.

9. The portable electronic device with projection function according to claim 1, wherein the projection module receives image signals from the host through wireless transmission.

10. The portable electronic device with projection function according to claim 1, wherein the host has an operation surface, a keyboard and a touch panel, and the keyboard and the touch panel are disposed on the operation surface.

11. The portable electronic device with projection function according to claim 1, further comprising:
    a display unit, pivoted to the host.

* * * * *